United States Patent
Zwaan et al.

(10) Patent No.: US 8,548,314 B2
(45) Date of Patent: Oct. 1, 2013

(54) ARTICULATED SENSOR SUPPORT STRUCTURE

(75) Inventors: John Peter Zwaan, Simi Valley, CA (US); Makoto Ueno, Canoga Park, CA (US); Marc L. Schmalzel, Simi Valley, CA (US); Christopher E. Fisher, Simi Valley, CA (US)

(73) Assignee: AeroVironment, Inc., Monrovia, CA (US)

( * ) Notice: Subject to any disclaimer, the term of this patent is extended or adjusted under 35 U.S.C. 154(b) by 0 days.

(21) Appl. No.: 13/478,764

(22) Filed: May 23, 2012

(65) Prior Publication Data
US 2012/0251092 A1    Oct. 4, 2012

Related U.S. Application Data

(63) Continuation of application No. PCT/US2010/058037, filed on Nov. 24, 2010.

(60) Provisional application No. 61/264,601, filed on Nov. 25, 2009.

(51) Int. Cl.
*G03B 39/00*    (2006.01)
*G03B 17/00*    (2006.01)

(52) U.S. Cl.
USPC ........................................... 396/12; 396/428

(58) Field of Classification Search
USPC ...... 396/7, 12, 13, 419, 427, 428; 248/287.1; 348/373–374
See application file for complete search history.

(56) References Cited

U.S. PATENT DOCUMENTS

| | | | |
|---|---|---|---|
| 2,677,515 A | 5/1954 | Perry | |
| 3,647,166 A | 3/1972 | Riedl | |
| 6,286,806 B1 | 9/2001 | Corcoran | |
| 6,880,987 B2 * | 4/2005 | Diana et al. | 396/427 |
| 7,000,883 B2 | 2/2006 | Mercadal et al. | |
| 7,066,501 B2 | 6/2006 | Meineke et al. | |
| 2005/0029398 A1 | 2/2005 | Lowe et al. | |
| 2008/0267612 A1 | 10/2008 | Harvey | |

FOREIGN PATENT DOCUMENTS
WO    WO 2008/119144    10/2009

OTHER PUBLICATIONS
International Search Report for Serial No. PCT/US2010/058037 mailed Mar. 18, 2011.

* cited by examiner

*Primary Examiner* — W B Perkey
*Assistant Examiner* — Minh Phan
(74) *Attorney, Agent, or Firm* — Brooks Acordia IP Law, P.C.; Eric Aagaard

(57) ABSTRACT

Embodiments include an assembly comprising: (a) a camera support structure comprising: a masthead disposed on the distal end of a mast wherein the masthead is configured to receive an imaging element; where a proximal end of the mast rotatably engaging an azimuth-elevation joint assembly wherein the azimuth-elevation joint assembly comprises a first angular actuator of a first rotational degree-of-freedom and a second angular actuator of a second rotational degree of freedom; and (b) a camera support structure housing comprising an aperture and a hatch wherein the hatch is resiliently biased to close the aperture; and wherein the camera support structure is configured to overcome the hatch resilient bias by at least one of: the release of a pin restraining a loaded spring and a rotational actuation of the mast via at least one of the first angular actuator and the second angular actuator.

10 Claims, 6 Drawing Sheets

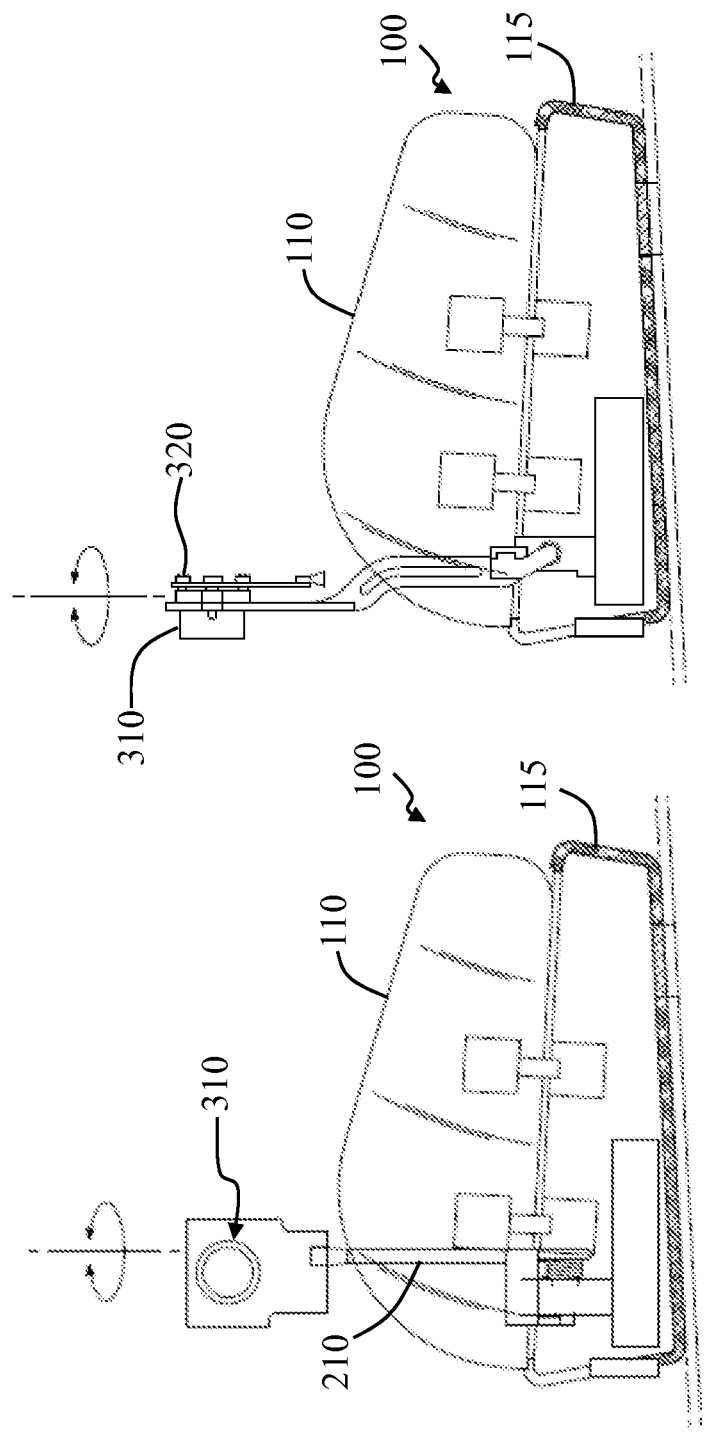

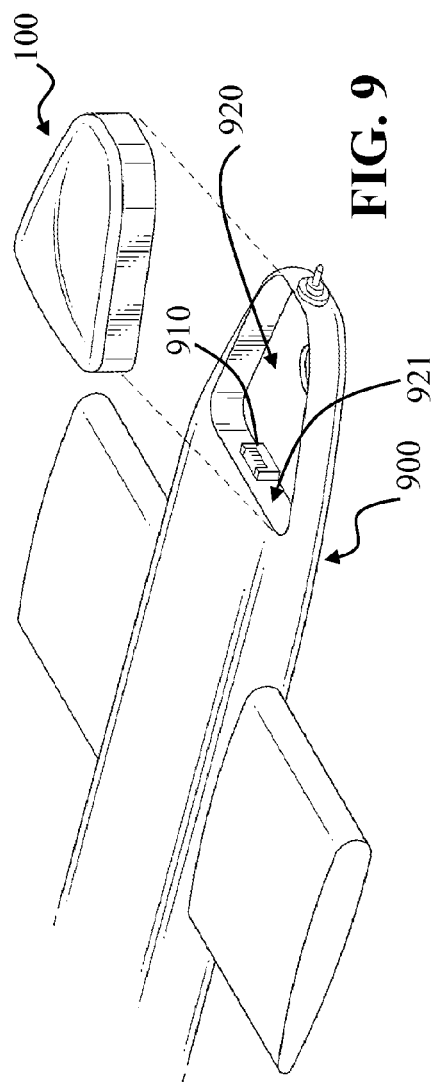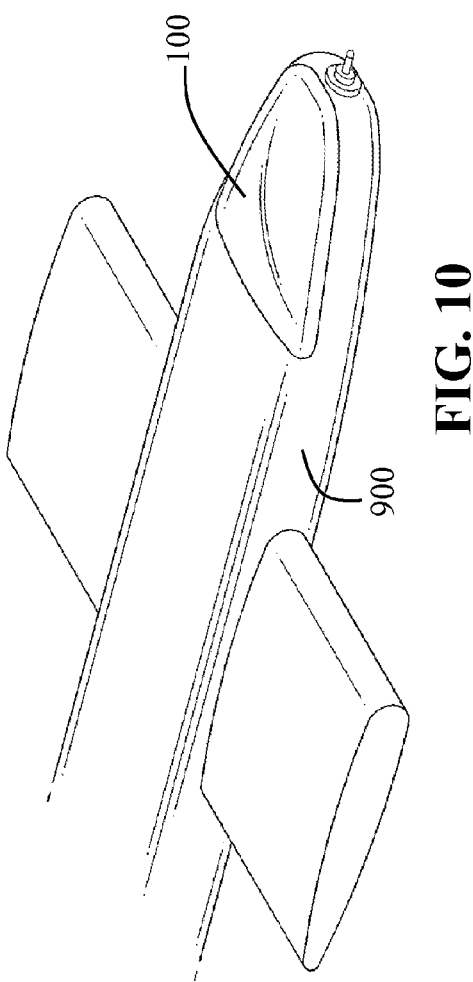

ARTICULATED SENSOR SUPPORT STRUCTURE

CROSS-REFERENCE TO RELATED APPLICATIONS

This application is a continuation of International Application No. PCT/US2010/058037, filed Nov. 24, 2010, and claims priority to and the benefit of U.S. Provisional Patent Application Ser. No. 61/264,601, filed Nov. 25, 2009, all of which are hereby incorporated herein by reference in their entirety for all purposes.

FEDERALLY SPONSORED RESEARCH

The invention was made with Government support under HR0011-07-C-0075 awarded by DARPA. The Government has certain rights in the invention.

TECHNICAL FIELD

Embodiments pertain to articulated support structures and particularly to modular articulated support structures for a sensor.

BACKGROUND

A sensor, such as an imaging sensor, may be mounted on a support member such as a stanchion. An imaging sensor may be mounted on a powered platform having two-axes of rotation.

SUMMARY

Embodiments include an unmanned aerial vehicle comprising: a sensor support structure which comprises a sensor masthead disposed on a distal end of a mast, wherein a proximal end of the mast rotatably engages an azimuth-elevation joint assembly. In some embodiments, the unmanned aerial vehicle may be comprised of an azimuth-elevation joint assembly comprising a first angular actuator of a first rotational degree-of-freedom and a second angular actuator of a second rotational degree of freedom. In some embodiments of the unmanned aerial vehicle the sensor masthead may be configured to receive an imaging element. In other embodiments of the unmanned aerial vehicle the sensor support structure may be a camera support structure In other embodiments the unmanned aerial vehicle may further comprise a sensor support structure housing, which may be a camera support structure, comprising an aperture having a perimeter that may further comprise a hatch rotatably attached to a portion of the sensor support structure housing; wherein the hatch is resiliently biased to rotatably engage the aperture proximate to the perimeter of the aperture. In this embodiment, the sensor support structure may be configured to overcome the hatch resilient bias by the release, e.g., via a lineal actuator, of a pin restraining a loaded spring and/or may be configured to overcome the hatch resilient bias by a rotational actuation of the mast via at least one of: (a) the first angular actuator and (b) the second angular actuator.

Embodiments include an assembly comprising: (a) a camera support structure comprising: a masthead disposed on the distal end of a mast wherein the masthead is configured to receive an imaging element; where a proximal end of the mast rotatably engaging an azimuth-elevation joint assembly wherein the azimuth-elevation joint assembly comprises a first angular actuator of a first rotational degree-of-freedom and a second angular actuator of a second rotational degree of freedom; and (b) a camera support structure housing comprising an aperture and a hatch where the hatch may be resiliently biased to close about the aperture and where the camera support structure may be configured to overcome the hatch resilient bias by at least one of: (a) the release of a pin restraining a loaded spring and (b) a rotational actuation of the mast via at least one of: (i) the first angular actuator and (ii) the second angular actuator.

Some embodiments include a method of deploying and retracting an image sensor support structure from an image sensor support housing, where the method comprises: (a) removing a loaded spring restraining pin of a mast of the image sensor support structure; (b) rotatably swinging open a hatch, that may be rotatably resiliently biased, of the image sensor support housing, by the unrestrained spring loaded mast; and (c) rotationally actuating the mast via at least one of the first angular actuator and the second angular actuator. Method embodiments of deploying and retracting an image sensor support structure from an image sensor support housing may further comprise elevationally retracting the mast of the image sensor support structure and replacing the loaded spring restraining pin of the mast of the image sensor support structure.

BRIEF DESCRIPTION OF THE DRAWINGS

Embodiments are illustrated by way of example and not limitation in the figures of the accompanying drawings, and in which:

FIG. 7 is a side elevational view in cross-section of the extended sensor support in a rotatable position 90 degrees from the angle of rotation depicted in FIG. 6;

FIG. 8 is a side elevational view in cross-section of the extended sensor support in a rotatable position 180 degrees from the angle of rotation depicted in FIG. 6; FIG. 9 depicts the exemplary housing that may engage a forward portion of an air vehicle;

FIG. 10 depicts the exemplary housing engaging a forward portion of an air vehicle.

DETAILED DESCRIPTION

Figure 1:
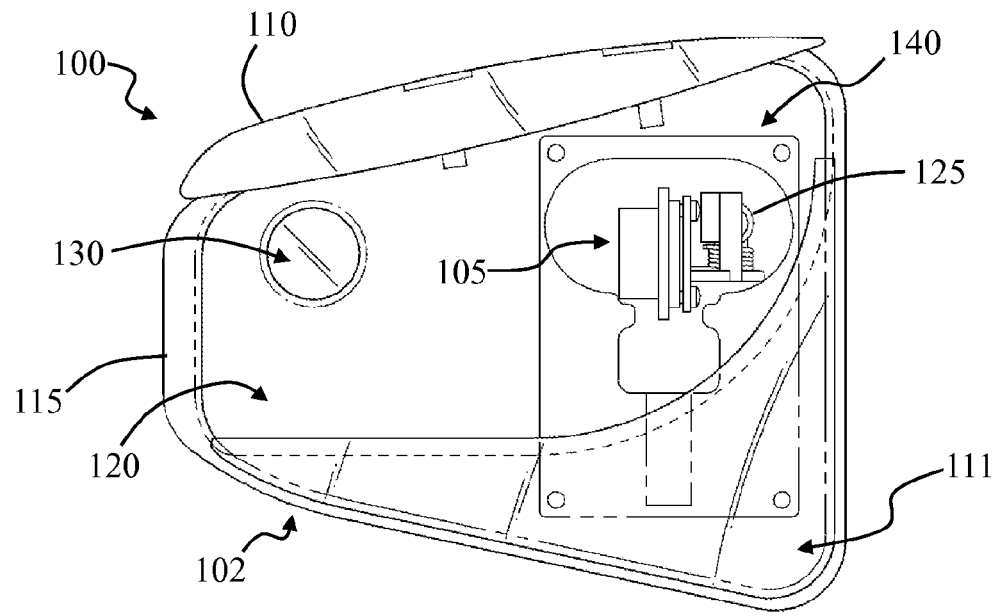
FIG. 1 is a plan view of an exemplary housing having a translucent top with an open hatch and a top view of a deployed support structure.

Reference is made to the drawings that illustrate exemplary embodiments. FIG. 1 is a plan view of an exemplary housing having a translucent top with an open hatch and a top view of a deployed support structure. A housing 100 is depicted having a transparent top 102 comprising a hatch 110 and a partial fixed cover 111, and where the housing 100 further includes an enclosure 115. The bottom portion of the enclosure is shown as including a transparent aperture 130. A sensor support assembly 140 is shown disposed on a top surface of the bottom portion of the enclosure 120, where the sensor support assembly 105 is shown including a camera lens. The top 102 may be opaque or translucent. The sensor support structure 105 is shown mounted on a first rotatable joint 125 and a second rotatable joint 126, 127. The hatch 110 may be configured to rotate about a spring-loaded hinge in the direction of closing on the aperture when the support structure is retracted into the housing volume.

Figure 2:
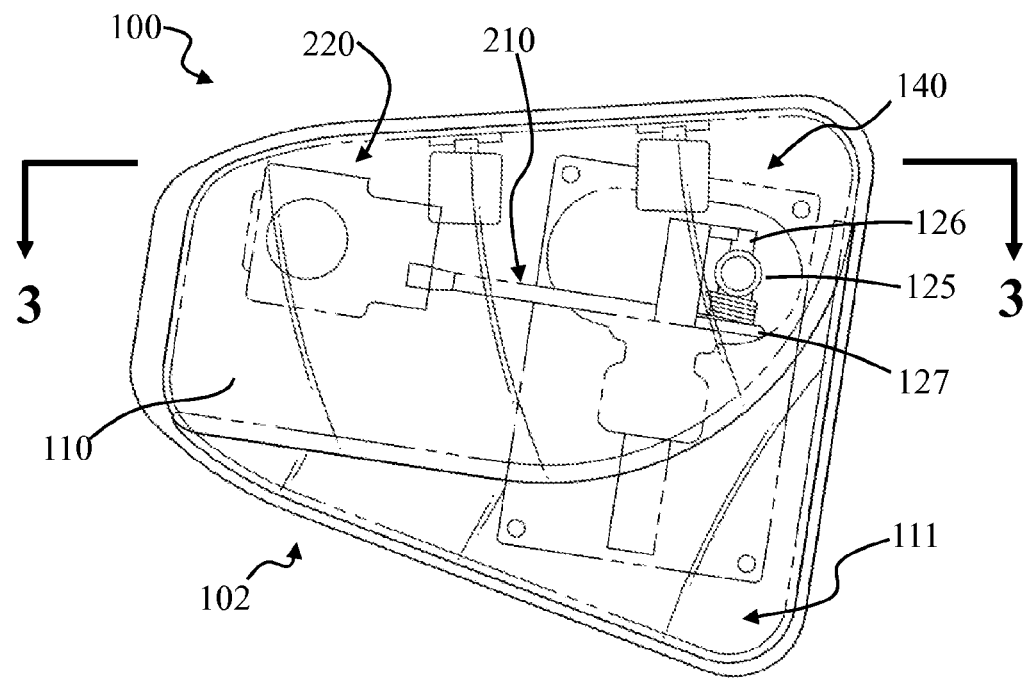
FIG. 2 is a plan view of an exemplary housing of FIG. 1 where the hatch of the translucent top is closed.

FIG. 2 is a plan view of an exemplary housing of FIG. 1 where the hatch 110 of the translucent top 102 is closed. A portion of the sensor support assembly 140 is shown retracted in the volume defined by the enclosure 115 and the top 102. A mast 210 or arm is shown extending from the second joint 126, 127 to a sensor mounting member 220.

Figure 3:
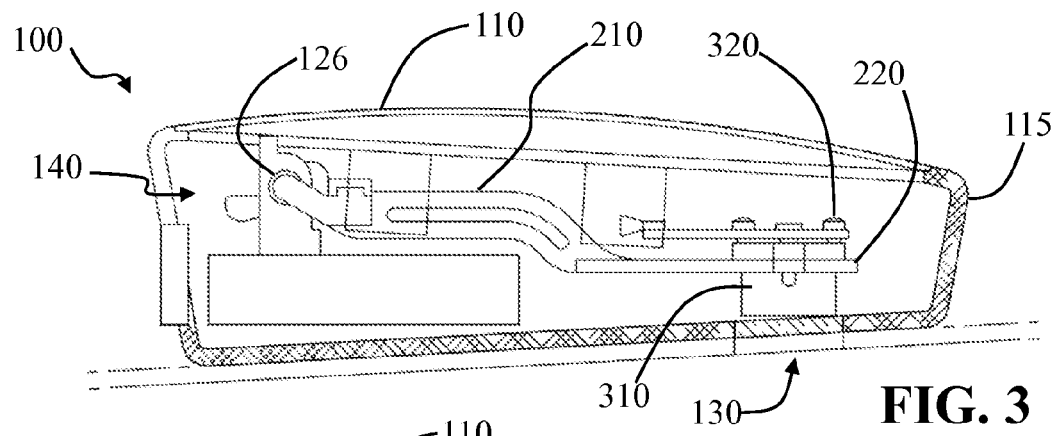
FIG. 3 is a side elevational view in cross-section of the sensor support in a retracted position.

FIG. 3 is a side elevational view in cross-section of the sensor support in a retracted position. A lens 310 and lens attachment assembly 320 are shown disposed at the sensor mounting member 220, and the lens 310 is shown oriented toward the transparent aperture 130.

Figure 4:
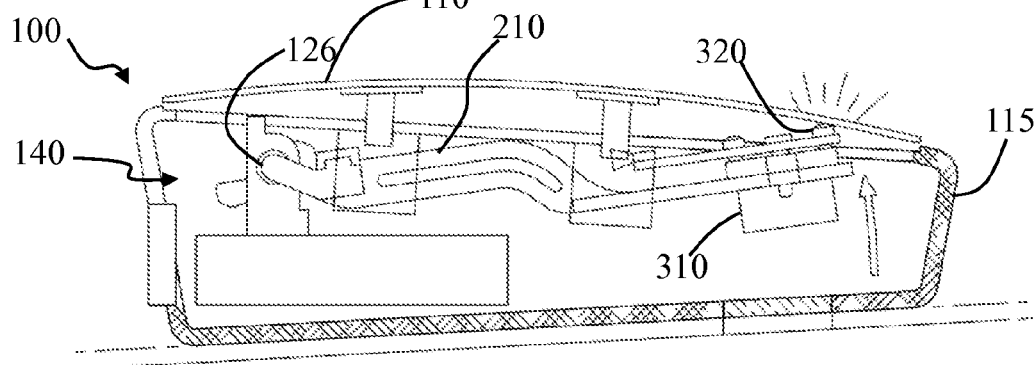
FIG. 4 is a side elevational view in cross-section of the sensor support in an early stage of extension.

FIG. 4 is a side elevational view in cross-section of the sensor support in an early stage of extension. The arm or mast 210 may be rotated about the axis of the second joint due to a release spring previously in tension or may be driven by an actuating element. As the mast 210 is rotated away from the bottom of the enclosure, the sensor attachment assembly 320 contacts and lifts the hatch 110.

Figure 5:
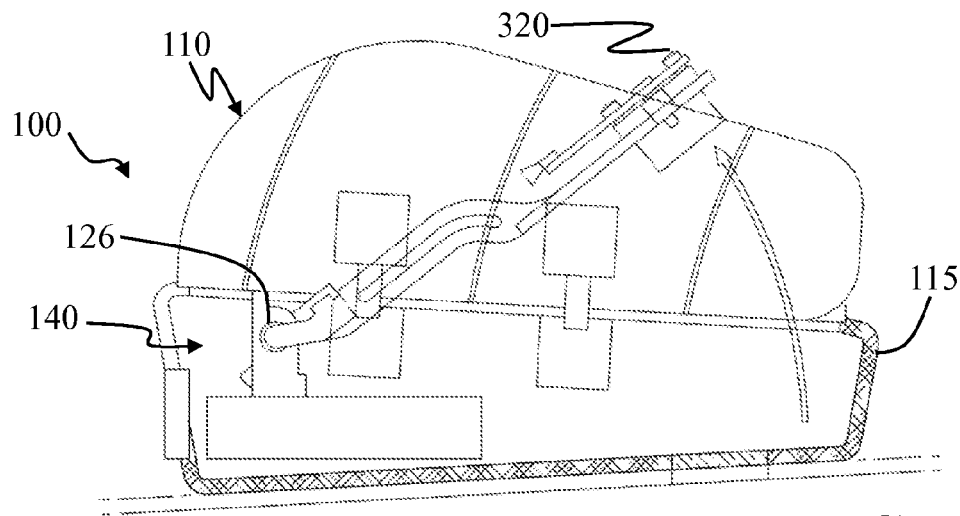
FIG. 5 is a side elevational view in cross-section of the sensor support in an early stage of extension with the hatch open.

FIG. 5 is a side elevational view in cross-section of the sensor support, in an early stage of extension with the hatch 110 open as the sensor attachment assembly 320 clears the edge of the hatch 110.

Figure 6:
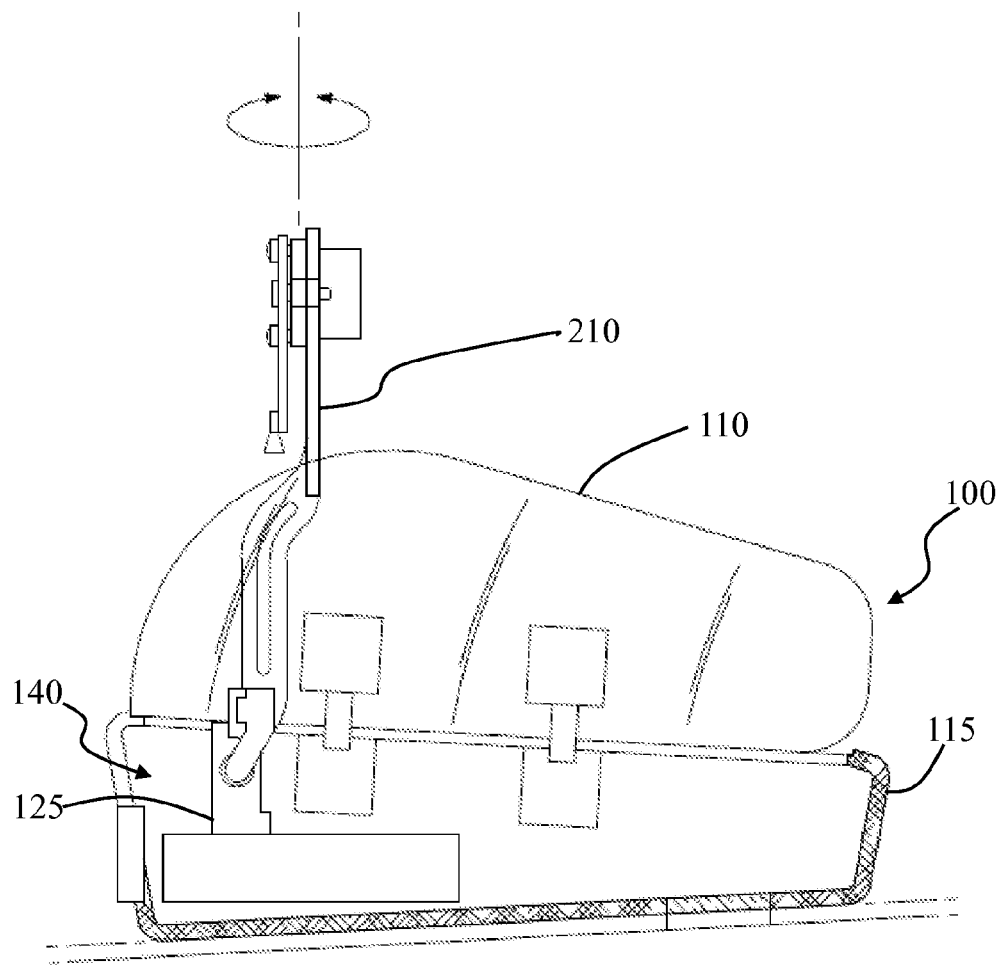
FIG. 6 is a side elevational view in cross-section of the extended sensor support in a rotatable position.

FIG. 6 is a side elevational view in cross-section of the extended sensor support in a extended potion and rotatable about the first rotatable joint 125. FIG. 7 is a side elevational view in cross-section of the extended sensor support in a rotatable position 90 degrees from the angle of rotation depicted in FIG. 6. FIG. 8 is a side elevational view in cross-section of the extended sensor support in a rotatable position 180 degrees from the angle of rotation depicted in FIG. 6.

Figure 11:
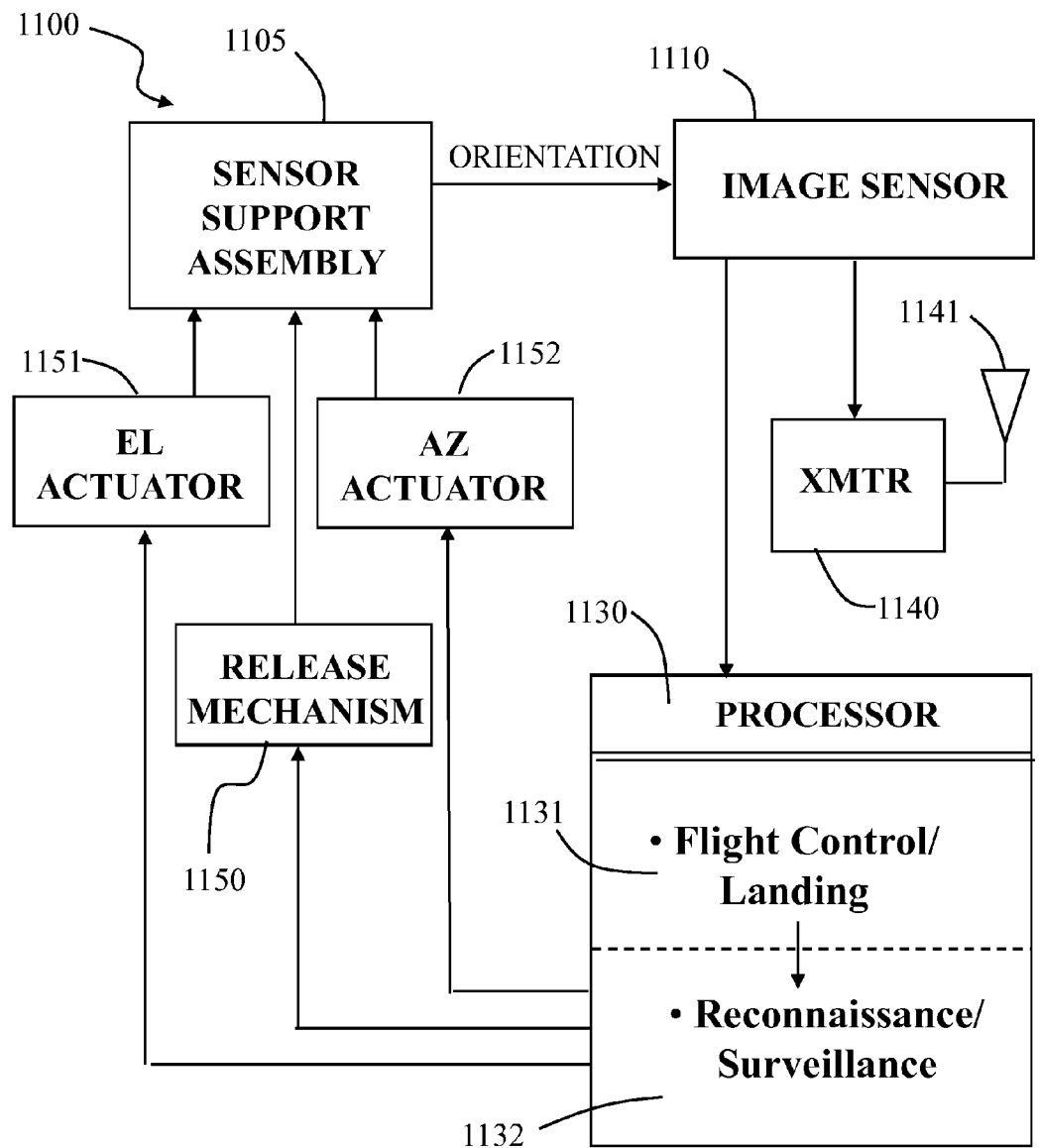
FIG. 11 depicts in a top-level a block diagram of a system that may use an exemplary embodiment of the articulated sensor support assembly

FIG. 9 depicts the exemplary camera structural housing 100 that may engage a forward portion of an air vehicle 900. An input/output interface 910 may be disposed within the receiving cavity 920 of the air vehicle 900, e.g., along a wall 921 defining a portion of the receiving cavity 920. FIG. 10 depicts the exemplary camera structural housing 100 engaging a forward portion of an air vehicle 900. Accordingly in an air vehicle embodiment, the lens may support a down-looking imaging device. The output of the imaging device may be used to aid flight control and/or landing guidance. Once the landing phase is complete, the sensor support assembly may be commanded or released to extend, via the hatch, to an upright position and thereafter scan in azimuth to pan the horizon in a reconnaissance or surveillance mode. FIG. 11 depicts in a top-level block diagram of a system 1100 that may use an exemplary embodiment of the articulated sensor support assembly 1105. In a retracted position, the image sensor 1110 may provide information for flight control processing 1131 by a processor 1130 and/or the image information may be transmitted to a receiving station via a downlink such as a transmitter 1140 and antenna 1141. Once landed, the image sensor may be used for reconnaissance/surveillance and such use may be facilitated by the release 1150 of a spring-loaded arm or the actuation of an elevation actuator 1151 applying torque to elevate rotationally the sensor support assembly. The release mechanism 1150 may comprise a solenoid-actuated pin. The reconnaissance/surveillance processing 1132 may command, via an output interface, an azimuth motor 1152 to turn the sensor support assembly in order to scan the local horizon. In some embodiments, the sensor support assembly may be returned to a stowed position for take-off by the elevation actuator 1151.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. An unmanned aerial vehicle comprising:
a sensor support structure comprising:
a sensor masthead disposed on a distal end of a mast;
wherein a proximal end of the mast rotatably engages an azimuth-elevation joint assembly;
a sensor support structure housing comprising an aperture having a perimeter; and
a hatch rotatably attached to a portion of the sensor support structure housing;
wherein the hatch is resiliently biased to rotatably engage the aperture proximate to the perimeter of the aperture;
wherein the sensor support structure is configured to overcome the hatch resilient bias by the release of a pin restraining a loaded spring.

2. The unmanned aerial vehicle of claim 1 wherein the azimuth-elevation joint assembly comprises a first angular actuator of a first rotational degree-of-freedom and a second angular actuator of a second rotational degree of freedom.

3. The unmanned aerial vehicle of claim 1 wherein the sensor masthead is configured to receive an imaging element.

4. The unmanned aerial vehicle of claim 1 wherein the sensor support structure is a camera support structure.

5. The unmanned aerial vehicle of claim 2 wherein the sensor support structure is configured to overcome the hatch resilient bias by the release of the pin restraining the loaded spring and a rotational actuation of the mast via at least one of: the first angular actuator and the second angular actuator.

6. The unmanned aerial vehicle of claim 1 wherein the sensor support structure housing is a camera support structure.

7. An assembly comprising:
a camera support structure comprising:
a masthead disposed on a distal end of a mast wherein the masthead is configured to receive an imaging element;
wherein a proximal end of the mast rotatably engaging an azimuth-elevation joint assembly wherein the azimuth-elevation joint assembly comprises a first angular actuator of a first rotational degree-of- freedom and a second angular actuator of a second rotational degree of freedom; and
a camera1 support structure housing comprising an aperture and a hatch wherein the hatch is resiliently biased to rotatably engage the aperture; and wherein the camera support structure is configured to overcome the hatch resilient bias by at least one of: the release of a pin restraining a loaded spring and a rotational actuation of the mast via at least one of the first angular actuator and the second angular actuator.

8. A method of deploying and retracting an image sensor support structure from an image sensor support housing, the method comprising:
- removing a loaded spring restraining pin of a mast of the image sensor support structure;
- rotatably swinging open a hatch of the image sensor support housing, by the unrestrained spring loaded mast; and
- rotationally actuating the mast via at least one of the first angular actuator and the second angular actuator.

9. The method of deploying and retracting an image sensor support structure from an image sensor support housing of claim 8 wherein the hatch is rotatably resiliently biased.

10. The method of deploying and retracting an image sensor support structure from an image sensor support housing of claim 8 further comprising:
- elevationally retracting the mast of the image sensor support structure; and
- replacing the loaded spring restraining pin of the mast of the image sensor support structure.

\* \* \* \* \*